CONTROL SYSTEM FOR WIDEBAND RECORDING AND REPRODUCING SYSTEMS

Filed April 20, 1964

3 Sheets-Sheet 1

INVENTOR.
DONALD B. MACLEOD

BY Robert G. Clay

ATTORNEY

INVENTOR.
DONALD B. MAC LEOD
BY Robert S. Clay
ATTORNEY

CONTROL SYSTEM FOR WIDEBAND RECORDING AND REPRODUCING SYSTEMS

INVENTOR.
DONALD B. MACLEOD

BY Robert G. Clay

ATTORNEY 3,358,080
CONTROL SYSTEM FOR WIDEBAND RECORDING AND REPRODUCING SYSTEMS

Donald B. MacLeod, Redwood City, Calif., assignor to Ampex Corporation, Redwood City, Calif., a corporation of California Filed Apr. 20, 1964, Ser. No. 360,850
31 Claims. (Cl. 178—6.6)

This invention relates to wideband recording and reproducing systems, and more particularly to an arrangement for relatively low cost but precise control of the time base of recorded and reproduced television program signals.

Systems which are capable of recording and reproducing signals having high information content are usually referred to as wideband systems, because of the frequency bandwidth required to contain the information. While such systems may use electrostatic, thermoplastic or photographic recording media, they usually have employed magnetic storage members, because of the relatively low cost and high reliability of such members, together with the fact that the recording can be modified or erased. Systems of this nature are in wide use for television program material, closed circuit video presentations, and for recording large quantities of digital and analog data, among other applications.

In wideband magnetic tape recording and reproducing systems, a high relative speed must be established between the magnetic transducers and the tape in order to provide the necessary bandwidth. For this reason, some form of scanning head assembly is usually employed to avoid the more severe problems involved in driving the tape itself at very high speed. The most widely used type of scanning head assembly, and the one which offers the greatest bandwidth and system versatility, is a system using a scanning head drum which passes the heads substantially transversely across the longitudinal axis of the tape, as the tape itself is moved at a relatively slow speed. By cupping a relatively wide tape about the head drum, and by switching between the heads at appropriate points during playback, continuous video or digital data can be recorded and reproduced with excellent time base stability.

The time base stability problem is inherent in any wideband system, whether fixed or scanning heads are used, because a small amount of mechanical displacement error introduces a relatively great amount of time base error. For example, a head displacement of a few thousandths of an inch from its nominal position along the recording track on the tape means a time base shift of many microseconds, which is intolerable in virtually any wideband data system. Accordingly, servo systems are employed for monitoring and correcting the position of the scanning head mechanism relative to the tape during both record and playback.

A more recent form of wideband recording and reproducing system has also been developed, principally for recording and reproducing television program material. In this type of system, the tape is passed about a scanning head mechanism which moves the heads at a small angle relative to the longitudinal axis of the tape. The heads define relatively long tracks along the tape, and by adjustment of the angle a relatively narrow tape may be used if desired. A track length may thus be selected such that, with one or a pair of heads, each track constitutes a complete field of television program material. The vertical blanking interval can be used for switching if needed, and a slight overlap between successive tracks can be used, so that no picture information is lost.

This type of system is lower in cost, not only because of the use of only one or two heads, but also because switching and signal recombination problems are reduced. Cost may be further reduced by accepting a narrower bandwidth, as in recording and reproducing television program material. Satisfactory time base stability is still required however, to assure freedom from raster wobble on the typical television receiver using flywheel controlled scanning circuits. Thus, the system must record television program signals in accordance with established standards, and frame and line variations must be kept within predetermined time limits under a variety of conditions.

In order to minimize cost and size, error and reference signals for controlling head position along the recorded tracks must be developed by the least complex means. The servo systems must also operate to compensate quickly for large errors, while tracking with maximum stability when in the desired operating range during playback. The control systems should avoid loss of control in the event of absence of an individual synchronizing signal. Further, the servo must operate to insure that the overlap relationship between adjacent tracks is properly related to the vertical blanking interval. Head switching times must be controlled, as well as the head speed. The mechanical system itself should not introduce any mechanical varations although this must be accomplished, to the extent possible, with a motor and motor drive circuits of low cost. Specifically, flutter during recording should not be permitted to affect the time base stability of the system during either record or playback.

It is therefore an object of the persent invention to provide an improved wideband recording and reproducing system.

Another object of the present invention is to provide an improved servo control system for a wideband magnetic tape recording and reproducing system.

A further object of the invention is to provide improved methods for providing time base stability in a wideband recorder.

Another object of the present invention is to provide an improved control system for a helical scan magnetic tape recorder and reproducer, which control system is characterized by simplicity and economy of cost.

Another object of the present invention is to provide an improved system for achieving a relatively high degree of time base stability in a helical scan recorder.

These and other objects of the present invention are achieved by an arrangement in accordance with the invention which utilizes a servo controlled helical scan head drum system for recording wideband data such as television program material. A variable frequency signal is developed for driving the head drum so that timing control is maintained during both record and playback.

In a two head scanning drum system for a magnetic tape recorder, the head drum servo system is locked to a vertical synchronizing signal source during the record mode, and a timing control track is laid down on one edge of the tape from a tachometer arrangement on the head drum. During playback, the timing control signal is reproduced and compared to the drum tachometer signals, so that the head drum is servoed in this mode to the previous speed variations of the head drum during recording. A square wave reference signal is developed in each mode, for phase comparison to a square wave tachometer signal generated in correspondence to head drum rotation. The reference signal initiates ramp waveforms which are clamped at variable levels, dependent on the tachometer signal. This DC signal constitutes the servo error signal for the system. A feature of the servo system includes means for compensating the servo error signal in accordance with its magnitude during playback, by varying the time constant of the servo circuit non-linearly in inverse relation to the error signal. Thus the servo locks on rapidly if a large error exists but tracks without response to flutter after the error has been reduced to a minimum amount. In addition, the servo includes means for preventing loss of control in the event of loss of a reference signal. To this end, the reference signal maintains a clamping circuit normally disabled, but the clamping circuit holds the error signal at a predetermined level if the reference signal is lost.

A feature of this system is the provision of a full range tracking control, such that on playback either head on the head drum may be caused to scan a given series of alternate tracks, for best matching of the playback characteristics.

Another feature of the invention is the provision of a relatively inexpensive means for positive indication of the phase and position of the head drum. Indicia coupled to the head drum generate timing signals to change the state of a bistable circuit at each half-cycle of the head drum. The indicia are varied in such manner, however, that associated gating circuits dependent upon the state of the bistable circuit insure a proper phase indication.

A further feature of the invention is the provision of a method for stabilizing the time base of the recorded and reproduced signal in a wideband system.

A better understanding of the invention may be had by reference to the following description, taken in conjunction with the accompanying drawings, in which.

Figure 1:
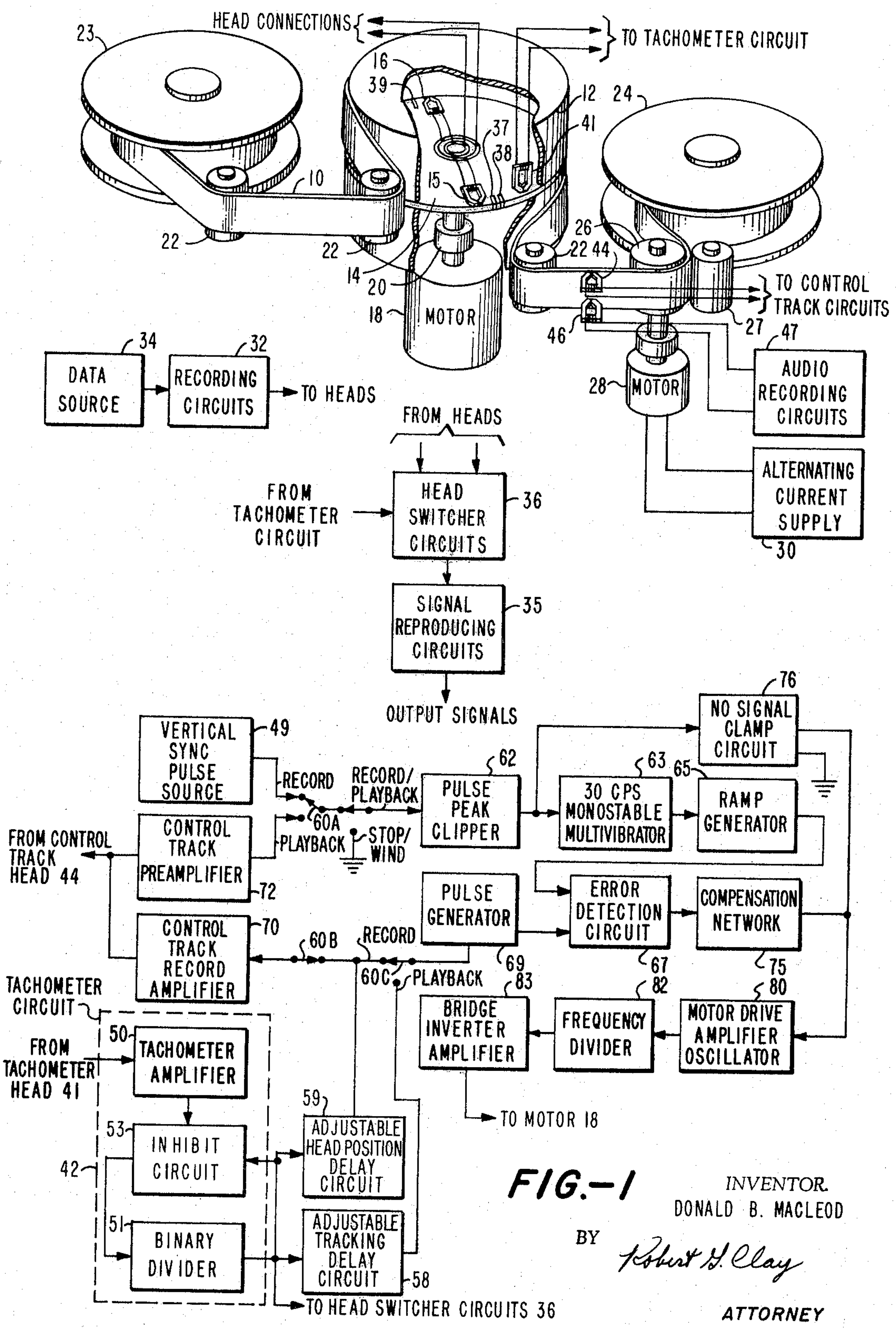
FIG. 1 is a partially broken away view of a wideband recording and reproducing system, showing in combined perspective and block diagram form the elements of a control system in accordance with the present invention.

Systems in accordance with the invention may be used for any wideband application. The exemplary system of FIG. 1 comprises a two head helical scan magnetic tape recording and reproducing system for handling television program material at low cost. A tape 10 is wrapped about a stationary upstanding cylinder 12 which is formed into upper and lower halves separated by a central circumferential opening within which rotates a head drum 14 having a pair of peripheral transducers 15, 16. The head drum 14 is driven by a motor 18 which is controlled by a sero system in accordance with the invention. A compliant coupling, such as a rubber disk 20, is positioned between the motor 18 and the head drum 14, and provides a mechanical low-pass filter in the head drum drive. Despite the need for close speed control the motor 18 may be a low cost device, such as a four-pole motor of the split-phase induction type, which operates synchronously with an applied alternating current signal. By "synchronously" is meant that the motor speed is proportioned to the frequency of the applied signal, but not necessarily the same. The alternating current signal, however, need not be of sinusoidal waveform.

The tape 10 is wound in a helical path about approximately half of the circumference of the cylinder 12, and confined to this path by guides 22 mounted between the cylinder 12 and a supply reel 23 and takeup reel 24. The wrap of the tape 10 about the cylinder 12 is such that the transducers 15, 16 scan tracks which form approximately 9° angles to the long axis of the tape. Each track is slightly more than a full field, so that an overlap interval exists. Details of the guide and reel mechanisms, including the reel motors, are not shown, inasmuch as these may be conventional. The tape path may also taken a number of forms other than that shown. The tape is advanced longitudinally at a selected speed by a capstan 26 and pinch roller 27, the capstan 26 being driven by a motor 28 which is actuated directly from an alternating current (AC) supply 30. The tape speed may be, for example, 3.75 inches per second. It is also feasible to servo control the capstan, but in the present example adequate time base stability is achieved by utilization of the cycle-to-cycle stability of the AC supply 30, together with a hysteresis synchronous motor. This arrangement provides substantially constant tape speed with very low flutter. Various tape tension and braking mechanisms may be employed as desired in conjunction with this arrangement, but these have also been omitted for simplicity.

The magnetic heads or transducers 15, 16 on the head drum 14 are coupled to recording circuits 32 which include record amplifiers and modulating circuits (not shown). The recording circuits receive signals from a data source 34 such as a camera or other associated equipment. On playback, the transducers 15, 16 are coupled to signal reproducing circuits 35 which include such preamplifier and interchannel compensation circuits (not shown in detail) as are required for the system. The brush and commutator assembly for coupling the recording circuits 32 and sginal reproducing circuits 35 to the rotating transducers 15, 16 has also not been shown in detail in FIG. 1. On playback, however, the signals from the transducers 15, 16 are successively switched to the reproducing circuits 35 under control of head switcher circuits 36 which are operated by timing signals provided as described below.

The head drum 14 also includes means providing tachometer reference pulses, in the form of a pair of magnetic elements 37, 38 disposed on one side of the head drum, and a single magnetic element 39 on the other side of the head drum 14. A reproduce head 41 disposed adjacent the periphery of the head drum 14 close to the path of the magnetic elements 37, 38 and 39 generates the tachometer signals as the drum 14 rotates. A tachometer circuit 42 receives the tachometer signals and generates a square wave for the associated control circuits. The term "square wave" is used herein to refer to pulse sequences in which the individual pulses are of square or rectangular waveform; the positive-going and negative-going portions are not necessarily equal in amplitude or duration. A control track record head 44 is positioned along one edge of the tape, and is coupled to record the tachometer signals as timing control signals for the servo system. Additional longitudinal tracks along the edge of the tape may be used for the recording of audio information supplied from an audio record head 46 coupled to audio recording circuits 47.

The control system also is responsive to signals from a source of vertical synchronizing pulses 49. Such pulses are ordinarily provided by stripping the 60 c.p.s. vertical synchronizing component from the studio video signal. While the vertical synchronizing pulses constitute a readily available source of time stable pulses, other reference signal sources may be utilized as well.

The tachometer circuit 42 and associated pulse generators are described in more detail below in conjunction with FIG. 3. The tachometer circuit 42 itself comprises, in general terms, a tachometer amplifier 50 which is arranged in conjunction with a binary divider 51 and an inhibit circuit 53 to identify the start of each full cycle of the head drum. The resultant periodic square wave signal is held in a definite phase relation to the head drum position so that the head switching may be properly controlled.

The tachometer circuits 42 generate, from the tachometer pulses, a 30 c.p.s. wave which defines the instantaneous angular position of the head drum 14. For head switching purposes, the two heads must be identified in some manner. Thus the 30 c.p.s. wave emanating from the tachometer circuits 42 is arranged to start with a given phase relationship to the head drum position. For the purpose of providing this phase indication, the binary divider circuit 51 and inhibit circuit 53 detect the paired pulses which mark the start of each cycle, and start each cycle of the square reference wave in a positive-going direction.

These 30 c.p.s. square wave signals are coupled to control the head switcher circuits 36 and also coupled into the servo system through a tracking delay circuit 58 or a head position delay circuit 59. The tracking delay circuit 58 (described in FIG. 4) permits selection during playback of the head which reproduces a given track, as well as relatively minor adjustments for maximum meter (not shown) indication on the system control panel. The head position delay circuit 59 may be varied as needed to set the position of vertical sync relative to the tape edge, to compensate for slight variations which may be introduced over long periods of operation. It may also be varied to position the instant of switching in any desired phase relation to the vertical sync or any other digital timing signal. A range of delay of approximately ±2 milliseconds is provided.

Selection of the record or playback mode by control of a three-pole, two-position switch 60 having "record" and "playback" terminals and three poles 60*a*, 60*b* and 60*c* completes circuit connections appropriate for each mode. With the armatures 60*a*, 60*b* and 60*c* in the record position, the vertical synchronizing source 49 is coupled to a pulse peak clipper 62 which provides uniform output pulses whether actuated by the vertical synchronizing or pulses reproduced from the control track. The vertical synchronizing pulses, at 60 cycles per second, actuate a 30 c.p.s. monostable multivibrator 63 which acts as a binary divider for the vertical synchronizing pulses but not for the reproduced timing pulses. The multivibrator 63, when actuated, has an active state of somewhat more than 16.66 milliseconds (msec.). It can accordingly be triggered by each of a number of pulses provided at approximately 33.3 msec. intervals, but only by every other pulse of a sequence provided at 16.6 msec. intervals. Output signals from the monostable multivibrator 63 are applied to a ramp generator 65 coupled to one input of an error detection circuit 67. A second input of the error detection circuit 67 is coupled to the output terminal of a pulse generator 69 which is connected to the third armature 60*c* of the switch 60. In the record mode, the pulse generator 69 is coupled to receive pulses from the head position delay circuit 59, at a repetition rate of 30 pulses per second. The error detection circuit 67 may be any one of a number of conventional phase comparators for servo systems. It is preferred, however, to use a circuit in which the level of the ramp signal from the ramp generator 65 at the time that a pulse is provided from the pulse generator 69 determines the amplitude of the output signal from the error generator. A specific example is provided in the description of FIG. 2.

When the system is in the record mode, the tachometer pulses are also applied through the armature 60*b* to the control track record amplifier 70, which is coupled to the control track head 44. These tachometer signals are therefore laid down directly as control or timing track signals for later use in playback.

In the playback mode, signals from the control track head 44 are provided through a control track preamplifier 72 and the armature 60*a* to the pulse peak clipper 62. Output signals provided from the peak clipper 62 serve the function of the reference pulses provided by the vertical synchronizing pulses in the record mode.

Whether the system is in record or playback, the time constant of the servo system may be modified in accordance with the action of a compensation network 75. Additionally, the output signal level may be held at a selected level by a no signal clamp circuit 76. Details of the peak clipper circuit 62, the monostable multivibrator 63, the ramp generator 65, the error detection circuit 67, the pulse generator 69, the compensation network 75 and the no signal clamp circuit 76 are provided below in conjunction with the description of FIG. 2.

The servo output signal is provided to a motor drive amplifier oscillator 80 having a nominal frequency of 120 cycles per second. In accordance with the amplitude of the error signal provided from the error signal generating means, the motor drive amplifier oscillator 80 shifts upwardly or downwardly in frequency. The variable frequency signal is provided to a frequency divider 82, such as a binary divider circuit, which provides an alternating output wave having square wave characteristics at half the frequency of the motor drive amplifier oscillator 80, or a nominal frequency of 60 cycles per second. The output of this motor drive amplifier frequency divider 82 is coupled through a bridge inverter amplifier circuit 83 to the motor 18. As is well known, a 60 cycle power signal drives a four-pole induction motor at a nominal speed of substantially 30 c.p.s. The motor 18 in turn is coupled through the rubber disk coupling 20 to the head drum 14.

Whether in the record or playback mode, the drive elements of the circuitry function in the same manner in rotating the head drum 14 under servo control. The square wave developed at the motor drive amplifier binary divider 82 is varied in frequency in accordance with the servo error signal, and this square wave is applied directly, after further amplification in the circuit 83, to the induction motor 85. The square wave signal avoids problems involved in modulation of high power signals but primarily permits design of a power amplifier having very high efficiency (e.g. in excess of 95%) thus a relatively simple, small and light amplifier may be used which generates little heat. The square wave signal does, however, contain odd harmonic frequency components which would in the usual instance introduce discontinuities into the rotational speeds of the driven member. Combination of the compliant coupling 20 in the motor drive, however, provides very low flutter, because the compliant coupling 20 acts as a low-pass filter at the frequencies of interest. The system also reduces other rotational errors, such as the torque pulsations which are typically inherent in induction motors.

In operation, the various parts of the system thus far described maintain control of the head drum speed, while also maintaining the recorded television fields in proper relationship to the edges of the tape. While recording, the head overlap interval is positioned relative to the vertical sync signal so that switching later takes place during the vertical blanking interval and no switching transient disrupts the picture. Other disturbing effects, such as time base errors due to varying tape tensions on dihedral errors, can also arise if switching is not accomplished within the vertical blanking interval, or at the approximate start of vertical blanking. In playback, the servo system additionally holds the heads on the previously recorded tracks, and the tachometer signals also govern head switching times.

During recording, the tachometer reference wave is fed to the control track head 44 and recorded in the control track on the tape. The wave is also fed through the head position delay circuit 59 and the armature 60*c* to the pulse generator 69 coupled into the error detection circuit. The head position delay circuit 59 inserts a selected time compensation relative to the vertical synchronizing signal, to compensate for circuit drifts or the use of an alternate head switching position relative to the vertical blanking interval.

Because the vertical synchronizing signal is 60 cycles per second, and is divided to 30 cycles per second in the 30 c.p.s. monostable multivibrator 63, the pulse repetition rates of the two pulse series provided to the error detection circuit 67 are alike. The pulses from the monostable multivibrator 63 constitute reference pulses which each actuate the ramp generator 65, to initiate a ramp waveform of a linear nature which continues to rise linearly over a predetermined interval. The ramp signals are applied to one input of the error detection circuit 67 for phase comparison to individual pulses from the pulse generator 69. Whether derived from the head position delay circuit 59 during record, or from the tracking delay circuit 58 during playback, the pulses in this recorded pulse series represent the actual position variations of the head drum 14.

The output signal from the error detection circuit 67 is of a selected amplitude, if the head drum speed is matched to the reference. The output signal deviates plus or minus from this level in amplitudes proportional to the extent of error, when the head drum speed varies from the reference. Signal variations are, however, fed into a lead-lag network in conventional servo fashion over some predetermined time interval, in order to achieve maximum bandwith and minimum error. The system time constant (or lead characteristic) is, however, varied automatically on playback in accordance with the error condition by the compensation network 75. A large error signal on playback preferably requires a fast lock-on time, so that a maximum lead and minimum time constant is needed. To this end the compensation network 75 appreciably shortens the time constant whenever the error is in excess of a predetermined level. Additionally, the error signal level may be held at a predetermined point, if the reference signals should be lost for any reason. The no signal clamp circuit 76 operates in conjunction with the pulse peak clipper to detect the absence of reference pulses, and thereupon effects the clamping action, so that the erroneous error output signal does not result in an excessive excursion of the head drum speed.

When operating in the playback mode, the previously recorded control signals are reproduced at the control track head 40 and fed through the switch armature **60*a* into the pulse shaper 62 and the servo system in lieu of the vertical sync pulses. In playback, however, the switch armature 60*c* couples the tachometer signal from the circuits 42 through the tracking delay circuit 58 to the pulse generator 69. The tracking delay circuit 58 provides a variable delay interval in excess of a full cycle of the tachometer signal. It permits the reference pulses to be shifted in time a sufficient amount so that either head can scan a given recorded track. The operation of the tachometer circuit 42 and head switcher circuits 36** remain unchanged, but as head wear and tape wear take place, the quality of the reproduced information can often be improved by switching between the heads which scan particular alternate tracks.

Figure 2:
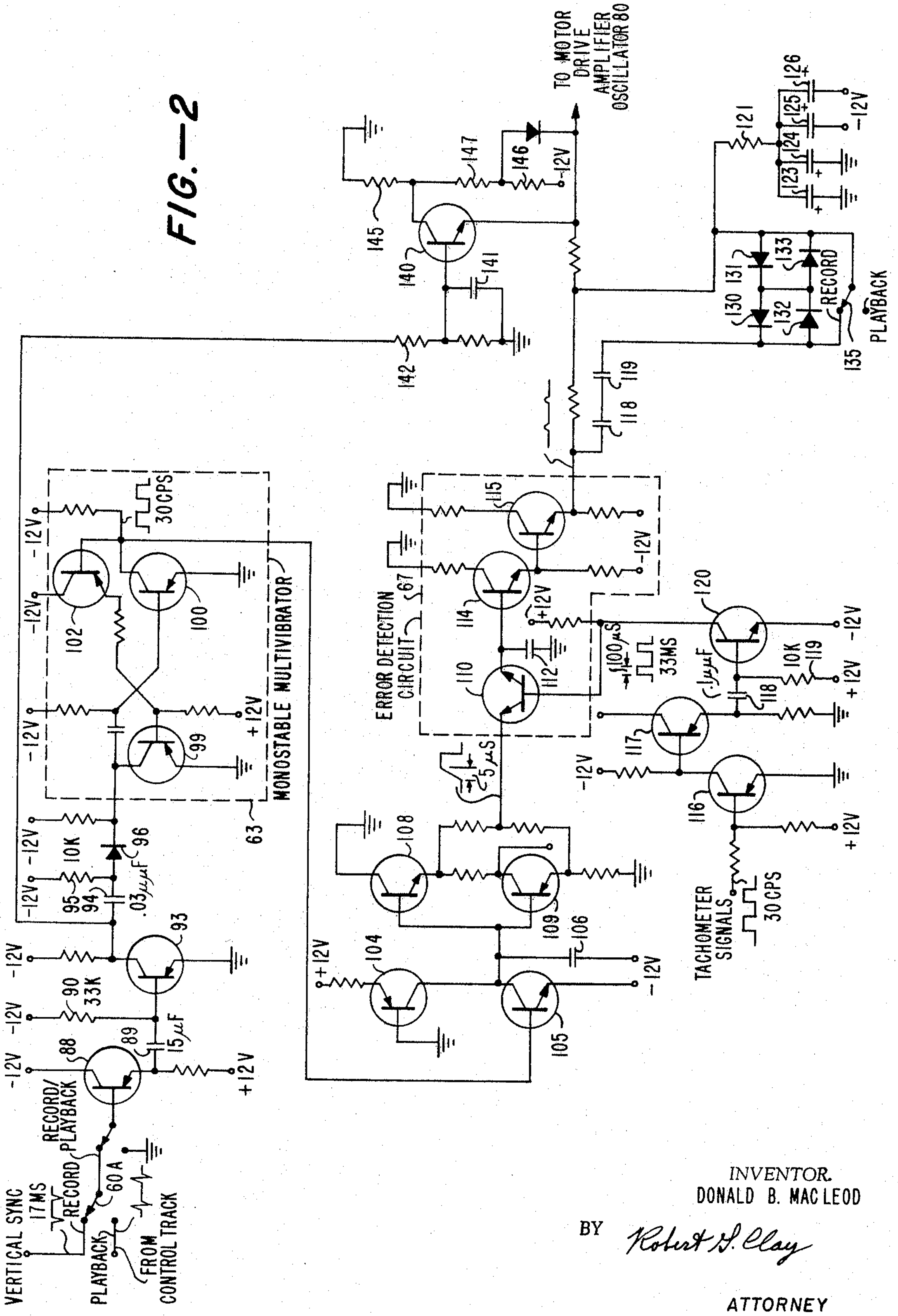
FIG. 2 is a schematic circuit diagram of servo error signal generating circuits, error signal compensation circuits and error signal clamping circuits which are preferably employed in the arrangement of FIG. 1.

The circuits which generate the servo error signal, including the pulse peak clipper 62, the monostable multivibrator 63, the ramp generator 65, the error detection circuit 67, the compensation network 75 and the signal clamping circuit 76 are shown in schematic form in FIG. 2. The input signals for these circuits are the vertical sync pulses at a 60 pulse/sec. repetition rate, the timing track pulses at a 30 pulse/sec. repetition rate, and the tachometer circuit 42 square wave output signal. Because the timing signal is recorded as a square wave, the reproduced timing track pulses appear differentiated, i.e. as positive-going pulses for each positive-going edge, and as negative-going pulses for each negative-going edge.

The timing track pulses or sync pulses are applied through an emitter follower 88 to a passive network 89, 90 coupled as a pulse peak clipper circuit with a transistor 93 which is normally conducting in the absence of a signal. Negative input pulses charge the capacitor 89 to a voltage equal to the pulse peak, due to diode action through the base-emitter circuit of the amplifier 93. In the interval between normally spaced pulses the amplifier 93 is held non-conducting, as the capacitor 89 discharges slightly through the resistor 90. Under these normal conditions, only positive-going output pulses are applied to the associated monostable multivibrator 63.

The peak clipper circuit also functions, however, to detect the absence of the reference pulses, and to operate in cooperation with the no signal clamp circuit 76. If reference pulses are absent for any extended interval the capacitor 89 discharges sufficiently for the amplifier 93 to conduct, and to remain on. The mean level of the signal at the collector of the amplifier 93 thereby provides a basis for control of the clamping operation.

Another feature of the peak clipper circuit is a variable threshold arrangement. The input pulses, as derived from the control track head 44, for example, may vary relatively slowly but appreciably in amplitude due to head wear, tape wear and like considerations. When the pulses are of high amplitude, the threshold level established by the passive circuit 89, 90 between the emitter follower and pulse peak clipper is similarly high, providing best discrimination against transients and noise. If the pulse peak level drops appreciably, however, the threshold level likewise drops, providing adequate assurance of detection of the pulse.

The sequence of output pulses from the amplifier 93 are applied to a differentiating circuit 94, 95 and by way of a trigger diode 96 to actuate the 30 c.p.s. monostable multivibrator 63. The multivibrator 63 includes a pair of conventionally cross-coupled transistors 99, 100, but also includes an emitter follower 102 coupled to the collector of the transistor 100. The emitter follower 100 isolates the output or collector circuit of the second transistor 100 from the base current of the other transistor 99 and permits the collector of the transistor 100 to approach −12 v. for proper ramp signal generation in the succeeding stage.

The active or delay interval of the multivibrator 63 is made slightly greater than the period (16.6 msec.) of the vertical sync pulses. Thus, when triggered by one sync pulse, it is not affected by the immediately succeeding pulse but is triggered instead by the third pulse in the series. The 60 pulse/sec. rate of the vertical sync pulses is thereby divided to a 30 pulse/sec. rate. At the same time, each of the 30 pulse/sec. timing pulses can actuate the multivibrator 63.

The ramp generator circuit 65 includes a pair of transistors 104, 105 arranged to switch on a constant current source under control of the slightly asymmetric square wave derived from the monostable multivibrator 63. The negative-going output signal from the multivibrator 63, provided during its active state, switches off the transistor 105 permitting the constant current generator transistor 104 to charge a storage capacitor 106 toward the +12 volt supply. When the input pulse terminates, the capacitor 106 is rapidly discharged. The charging rate is a substantially linear ramp waveform extending over, as shown, an approximately 5 msec. interval before a peak is reached. A pair of complementary-coupled emitter follower transistors 108, 109 convert the output signal to a low impedance signal of like polarity.

The low impedance trapezoidal waveform is applied as one input signal to a phase detector transistor 110 which is included in the error detector 67 of FIG. 1. The phase detector transistor 110 is a two input device, such as a type 2N1169, which is known as a bidirectional semiconductor and exhibits the characteristic of permitting interchange of emitter and collector with no decrease in current gain. One input signal to the phase detector transistor 110 is the ramp signal, which varies from −12 volts to 0 volts. The other input is a pulse train of considerably shorter sampling pulses provided in response to the tachometer signals, as described below, and which varies from a normal −12 volt to a voltage approaching +12 volts, when the sampling pulse is present. The phase detector transistor 110 operates as a normally open switch which is closed when the sampling pulses are present.

Accordingly, when the ramp signal is applied to the emitter of the transistor 110, the base is held at −12 volts, and the transistor 110 remains non-conducting as the emitter voltage builds up from −12 volts. If the head drum speed is correct, a sampling pulse is provided when the ramp voltage has been reached −6 volts, so that the switch is effectively closed. On closure of the switch, the voltage level present in the ramp circuit charges the associated storage capacitor 112 to a corresponding level, here −6 volts in this example. If the drum leads in phase relative to the reference, the sampling pulse is provided earlier and the charging signal is at a lower level, just as the charging signal is at a higher level if the drum lags in phase. The capacitor 112 maintains the charge until the next pulse occurs so that time displacement errors of the drum with respect to the reference signal are converted into a DC voltage whose instantaneous value defines the degree and phase of the displacement. This signal is again converted to a low impedance output through a series-coupled pair of emitter follower transistors 114, 115.

The pulse generator 69 of FIG. 1 which is coupled to the base of the phase detector transistor 110 comprises an inverter amplifier 116, and emitter follower 117, a differentiating circuit comprising a compacitor 118 and a resistor 119, and with the differentiating circuit being coupled to the base circuit of a switching transistor 120. The negative-going edges of the square wave tachometer signals are differentiated in the circuit 118, 119, turning off the normally conducting switching transistor 120 for an interval of approximately 100 microseconds. Thus the collector circuit of the transistor 120, which controls the base of the phase detector transistor 110 rises toward +12 volts for approximately 100 microseconds to provide the desired brief sampling signal for the error detection circuit 67.

The DC output signal at the error detection circuit 67 is coupled into the compensation network 75 which changes the lead-lag characteristics of the servo to vary the bandwidth or time constant of the servo. A lead network comprising principally a pair of capacitors 118, 119 and a resistor is coupled to a group of four reference capacitors 123 to 126. A bilateral diode network comprising four semiconductor diodes 130 to 133 is coupled in series with the capacitors 118, 119. The diode network may selectively be short circuited by a switch 135, which is operated in the short circuit position when the system is in the record mode.

The impedance of the bilateral diode network is therefore not presented in the lead network when the system is in the record mode. The speed-up action of the capacitors 118, 119 brings the lead-lag compensation into play, reducing the time constant of the system and providing maximum bandwidth for best record timing accuracy. In the playback mode, however, the bilateral diode network presents a variable impedance in series with the capacitors 118, 119, and can materially alter the time constant of the lead-lag network. The logarithmic response characteristic of the semiconductor diodes dictates that the impedance of the diodes varies in an inverse relation to the signal which is applied across them. This is a nonlinear relationship, in that the impedance drops off sharply after the forward conduction voltage of 1.4 volts (approximately 0.7 volt for each of two type 1N464 diodes) is exceeded.

When a small error voltage exists, therefore, relative to the −6 volt nominal level, the bilateral diode network appears as a high impedance element in the lead network path, significantly increasing the time constant of the system and reducing its tracking capability for minor deviations. This degradation of the servo response is of appreciable value to system performance, because the head drum does not follow any flutter (rapidly changing speed variation) which may be present in the control track. If such variations were followed precisely, they would give rise to raster wobble in the reproduced television picture. On the other hand, if a large error signal is present, the forward conduction voltage of the diodes is exceeded, the impedance of the bilateral diode network is greatly diminished, and the lead networks again becomes effective. Accordingly, the system may correct large errors rapidly, diminishing lock on time significantly. Thereafter, however, the system operates with improved speed stability because the flutter in the timing track signal is ignored.

The no signal clamp circuit 76 of FIG. 1 derives its control signals from the pulse peak clipper 62 above described, this signal comprising the successive clipped peaks under normal operation. The signal is applied to the base of a transistor 140 to which is coupled an integrating circuit comprising a capacitor 141 and a resistor 142 which average out the peaks in the signal and apply a mean voltage level to the base of the transistor 140. If the reference signals provided to the pulse peak clipper terminate, the threshold level of the base of the transistor amplifier 93 rises, turning on the amplifier 93 and raising the voltage level at the base of the transistor 140 in the no signal clamp circuit to turn it on. The collector of this transistor 140 is held at a selected voltage level by a pair of matched resistors 145, 146 and an additional resistor 147 which compensates for the collector-emitter drop in the transistor 140, such that when the transistor 140 conducts its emitter circuit clamps the servo error signal at −6 volts, which is the desired level for on-speed operation. The system therefore does not drift excessively from its desired speed, and quickly locks on to the reference signal, whenever the reference signal is again re-established.

Another feature of systems in accordance with the invention derives from the fact that all of the inputs to the servo system are essentially low frequency signals, as well as pulse or square wave inputs. Neither the reference nor the sample frequencies exceed a nominal frequency of 60 cycles per second. Thus the servo operates with safe lock-up and stability, as well as with relative simplicity.

Figure 3:
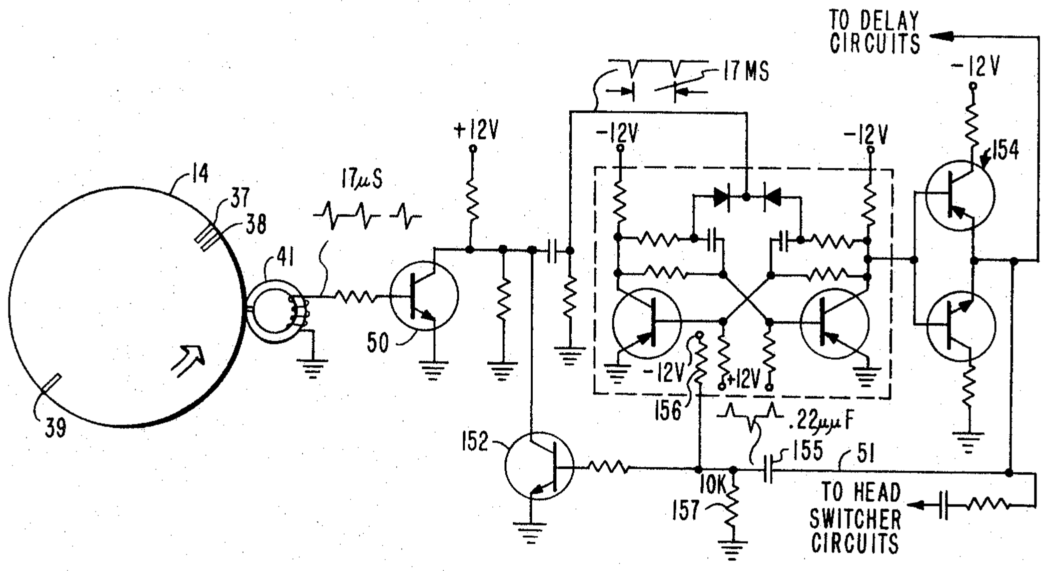
FIG. 3 is a combined partial perspective and schematic diagram of phase identification circuits useful in the head tachometer arrangement of FIG. 1.

The tachometer circuits 42 which provide a 30 c.p.s. square wave signal representing the speed and instantaneous angular position of the head drum are shown in schematic form in FIG. 3. The magnetic elements 37, 38 and 39 (FIG. 1) which are inserted in the head drum 14 are disposed with one pair of elements 37, 38 slightly separated (by 15°) at the start or index point on the head drum 14, and the remaining element 39 disposed 180° apart about the head drum. Thus, as these elements 37 to 39 pass the tachometer head 41, a pulse train is generated in which, assuming the nominal 30 c.p.s. speed of the head drum, there is first a closely spaced pair of pulses (the spacing being approximately 2 msec.) followed by another pulse at approximately 16.66 msec. This pulse train is applied to the base of the tachometer amplifier 50 for transfer to the binary divider 51. The collector circuit of the amplifier 50 is also coupled, however, to the collector circuit of a tachometer inhibit gate transistor 152, and cannot produce an output pulse when the transistor 152 conducts. The inhibit gate transistor 152 is in turn controlled for brief intervals by the state of the binary divider circuit 51.

In the event that the binary divider circuit 51 is properly set by the first impulse from the tachometer amplifier 50, the output stage of the divider circuit 51 is in a conducting state. The input terminal to a complementary transistor emitter follower circuit 154 is shifted to its positive-going voltage limit (substantially ground). This change of signal level is returned through the emitter follower circuit 154 and through a differentiating circuit 155, 156, 157 to the base of the inhibit gate transistor 152. The differentiating circuit 155, 156, 157 has a time constant of substantially 2 msec., and forms an alternating succession of positive and negative-going pulses for the inhibit gate transistor 152. The positive pulses turn on the transistor 152 for an interval of approximately 2 msec., and momentarily clamp the output from the tachometer amplifier 50 at a level such that the second of the closed spaced pair of pulses does not trigger the binary divider 51.

Accordingly, under these conditions the binary divider circuit 51 remains unchanged in state until the next pulse from the head tachometer 41, 16.66 milliseconds later, is applied through the tachometer amplifier 50. In the event that the binary divider circuit 51 is not set properly at the head drum start point, the first pulse of the closely spaced pair immediately sets the binary divider circuit 51 such that the output wave is negative-going. The differentiated pulse applied to the inhibit gate transistor 152 is negative-going, and the transistor 152 does not conduct. The second pulse of the pair thus is not blocked and is applied to reverse the state of the binary divider 51. Accordingly, the phase of the output signal is corrected and thereafter the signal remains in phase with the head drum. This feature of utilizing a pair of elements on the head drum to denote the index point, as well as the inhibit gate arrangement to identify the index point in conjunction with the binary divider circuit, provides an extremely economical means of reliably indicating the phase relationship of the wave, as well as also accomplishing the necessary frequency division.

Figure 4:
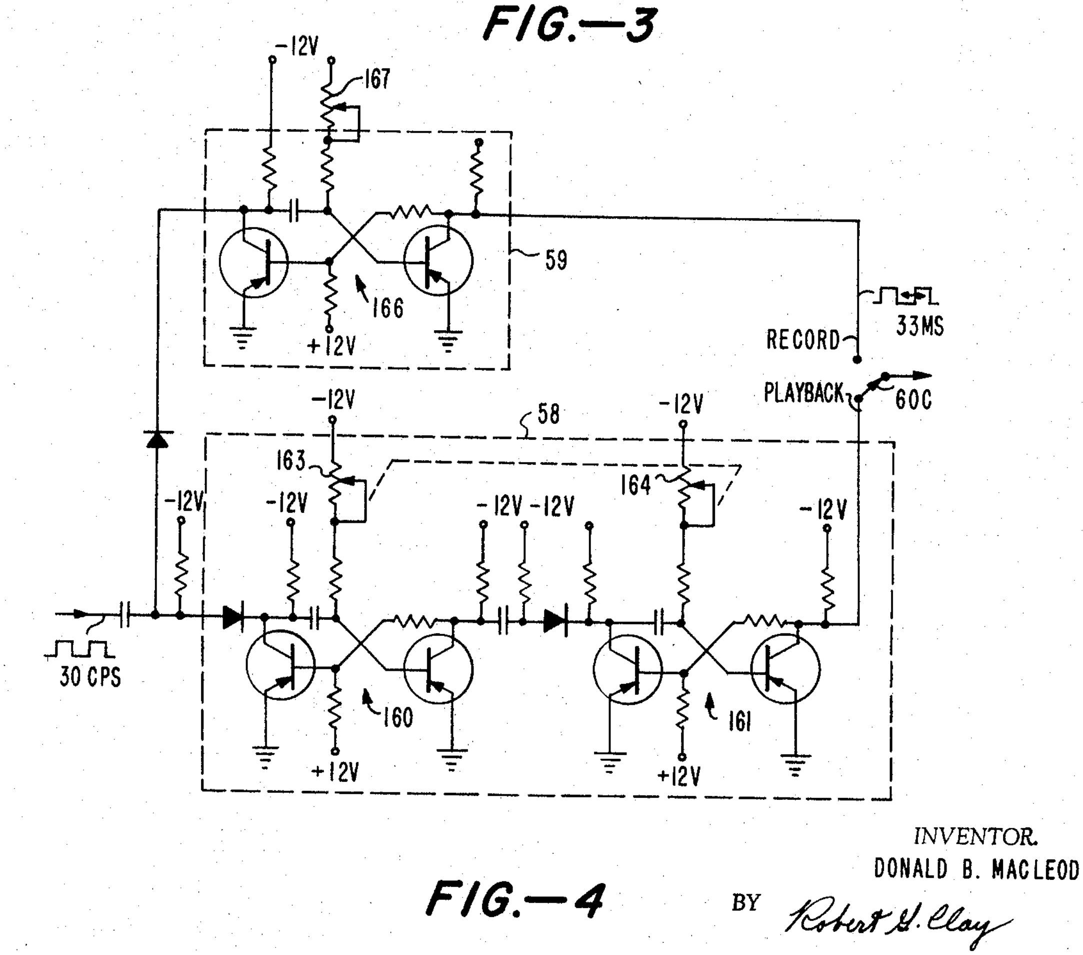
FIG. 4 is a schematic diagram of tracking control circuits which are preferably employed in the arrangement of FIG. 1.

The tracking delay circuit 58 and the head position delay circuit 59 of FIG. 1 operate during the playback and record modes respectively, and provide separate time adjustments of the signal waveform derived from the tachometer. As shown in FIG. 4, the tracking delay circuit 58 preferably comprises a pair of cascaded monostable multivibrators 160, 161. Adjustable resistors 163, 164 in the cross-couplings of the two monostable multivibrators 160, 161 are set together, to provide concurrent adjustment of the active or "on" intervals of each of the multivibrators 160, 161. Application of the leading edge of a pulse from the tachometer circuits 42 (FIG. 1) triggers the first monostable multivibrator 160, which remains on for a selected duration, and then triggers the second monostable multivibrator 161 into its active state. Adjustment of the duration of the active states of the two multivibrators 160, 161 shifts the time relation of the second pulse of the series, which is then used to trigger the associated pulse generator 69 (FIG. 1). The total delay interval provided by the pair of monostable multivibrators 160, 161 exceeds the time interval between successive 30 c.p.s. pulses. Thus, although head switching takes place without delay, as the head in scanning position moves across the edge of the tape, the track which is being scanned by a given head may be changed by use of the tracking control 58, so as to achieve best reproduction uniformity. The full wavelength of delay which is available insures an adequate range of signals are directed through the head position delay circuit 59, which also comprises a monostable multivibrator 166 with an adjustable resistor 167 in the cross coupling. The time constant of this multivibrator 166 also can be varied within a limited range by varying the setting of the resistor 167. The reference pulses are of course provided without time adjustment during the record mode, so this variation of the trailing edge of the waveform permits a change in the relative position at which vertical synchronizing pulses are recorded at the start of a field.

Though there have been described above and illustrated in the drawings various forms of control circuits for wideband recording and reproducing circuits in accordance with the invention, it will be appreciated that the invention may take many other forms, modifications and variations. Accordingly, the invention is to be construed as encompassing all alternative forms and variations falling within the scope of the appended claims.

What is claimed is:

1. A servo system for controlling the operation of a moving member in different modes, including the combination of servo means having a selected servo bandwidth for driving the moving member in synchronism with a time stable reference during operation in a first mode, means providing a timing signal representative of actual speed variations in the moving member during operation in the first mode, and means coupled to receive the timing signal, for modifying the operation of the servo means to provide a normally substantially narrower servo bandwidth during operation in a second mode.

2. A servo system for controlling the operation of a driven member in a wideband recording and reproducing system, including the combination of means responsive to the movement of the driven member for generating a timing signal representative of the instantaneous speed variations of the driven member, means coupled to the driven member and repsonsive to the timing signal, for controlling the speed of the driven member during recording, means for recording the timing signal during recording, means reproducing the recorded timing signal and coupling the timing signal to the speed controlling during reproduction, and means for varying the time constant of the system in accordance with the mode of operation, such that there is normally a more sluggish speed control during reproduction than during recording.

3. A servo system for controlling the operation of a scanning member in a wideband recording and reproducing system, including the combination of: means providing time reference signals; means responsive to the time reference signals during recording, and to the speed of the scanning member, for generating a servo output signal; means responsive to the servo output signal for controlling the speed of the scanning member; means responsive to speed variations of the scanning member during recording and coupled to the means for generating a servo output signal, for substituting timing signals for the time reference signals during reproduction; and means coupling the servo output signal to the speed controlling means for varying the servo bandwidth in accordance with the mode of operation.

4. A servo system for controlling the operation of a rotating scanning member in different modes of operation of a wideband recording and reproducing system, including the combination of means providing time reference signals for use in recording, means responsive to the time reference signals during recording, and to the speed of the scanning member, for generating a servo output signal, means, including a lead-lag network, responsive to the servo output signal for controlling the speed of the scanning member, means responsive to speed variations of the scanning member during recording and coupled to the means for generating a servo output signal during reproduction, for substituting timing signals representative of actual speed variations during recording for the time reference signals during reproduction, and means coupled to the means for controlling the speed of the scanning member, for varying the characteristics of the lead-lag network in accordance with the servo output signal, such that servo response is degraded during operation in the signal reproduction mode, whereby short term speed variations in the scanning member during operation in the record mode are not followed during the reproduction mode.

5. A wideband recording and reproducing system including a motor which is driven synchronously with an applied alternating wave, and which controls the movement of the scanning member, including the combination of means providing a first square wave representative of the speed of operation of the scanning member, means providing a second square wave representative of a timing reference signal, means responsive to the phase relationship between individual pulses of the first and second square waves for generating a D.C. error signal, variable frequency square wave generator means coupled to be controlled by the error signal, and means driving the motor in response to the variable frequency square wave signal.

6. In a magnetic tape recording and reproducing system for television program material, which system includes a pair of scanning heads on a cyclically operating head drum that alternately scan the tape helically to record or reproduce successive television fields, the combination comprising: control track recording and reproducing means disposed in operative relation to a longitudinal track on the tape; head tachometer signal generator means coupled to the scanning heads and providing at least a pair of successive control signals to denote selected starting points in the head drum cycles; means coupled to the signal generator means for providing tachometer control signals which denote head drum starting points by selected phase components of the tachometer control signal; adjustable delay means coupled to receive the tachometer control signals; means coupling the tachometer control signals to the control track recording and reproducing means during operation in the record mode; means providing time stable reference pulses; servo comparator means including a pair of input terminals and providing a servo error signal as output; means coupling the stable reference pulses and the tachometer control signals to the servo comparator means during operation in the record mode; means coupling the tachometer control signals and reproduced control signals and reproduced control signals from the control track recording and reproducing means during operation in the reproduce mode; compensation network means receiving the servo error signal and providing a variable signal dependent upon the level of the servo error signal; means coupled to said servo comparator means and responsive to one of the sequences of signals provided thereto for clamping the servo error signal at a selected nominal level in the absence of signals in the sequences applied thereto; means coupled to the compensation network means for providing a square wave motor drive signal; an induction motor coupled to receive the motor drive signal and to rotate in response thereto; and mechanical compliance means coupling the motor to the head drum.

7. The invention as set forth in claim 6 above, wherein the compensation network means includes diode means in series with a servo lead-lag network means and presenting high impedance when the applied signal is below a selected level, and means for short circuiting the diode means when the system is in the record mode, wherein the means for clamping the servo error signal is responsive to the presence of the time stable reference signals during operation in the record mode, and wherein the means for providing a square wave motor drive includes a silicon controlled rectifier circuit, and means responsive to the level of the compensated servo error signal for providing a variable frequency square wave signal.

8. The invention as set forth in claim 7 above, wherein in addition the means for generating a square wave power signal includes variable frequency oscillator means controlled by the compensated servo error signal, and means for dividing the frequency of the output signal of the variable frequency oscillator means.

9. In a magnetic tape record and reproducing system for television program material, which system includes a pair of scanning heads on a head drum which alternately scan the tape helically to record or reproduce successive television fields, the combination comprising: control track recording and reproducing means disposed in operative relation to a longitudinal track on the tape; head tachometer signal generator means coupled to and movable with the scanning heads, and including a pair of magnetic elements mounted in predetermined relation to one of the scanning heads and a single magnetic element mounted in a predetermined relation to the other of the scanning heads, and further including a tachometer transducer disposed in operative relation to the magnetic elements; tachometer signal generator means coupled to the tachometer transducer, the tachometer signal generator means including a binary divider circuit coupled to receive the signals reproduced by the tachometer transducer, and an inhibit circuit responsive to the state of the binary divider circuit and coupled to the input of the binary divider circuit to block application of the second of the closely spaced pair of pulses in correspondence to a selected state of the binary divider circuit, such that a square wave tachometer signal having a given phase relation and a proportional speed to the scanning head rotation is provided; adjustable delay means coupled to receive the tachometer signals, the adjustable delay means providing substantially a full wavelength of delay of the tachometer signal; means coupling the tachometer signals to the control track recording and reproducing means during operation in the record mode; means providing time stable reference pulses; servo comparator means having a pair of input terminals and providing a servo error output signal; ramp generator means coupled to one input of the comparator means; means coupling the reference pulses to the ramp generator means during operation in the record mode, and coupling the control track recording and reproducing means to the ramp generator means during operation in the playback mode; means coupling the control track recording and reproducing means to the second terminal of the comparator means during operation in the record mode, and coupling the adjustable delay means to the second terminal of the comparator means during operation in the playback mode; and drive means coupled to receive the output signals from the comparator means for controlling the operation of the scanning heads during the record and the playback modes.

10. In a system for generating an error signal for a servo system from a pair of periodic input pulse sequences, a first of which provides a reference wave, the combination comprising: means responsive to the first pulse sequence for providing a first series of square wave pulses at a corresponding pulse repetition rate; means responsive to the second pulse series for generating sampling pulses in a second series of square wave pulses having a nominal pulse repetition rate corresponding to the first pulse series, the pulses of the second series being substantially shorter in duration that those of the first; phase comparison means coupled to receive the sampling pulses and the first series of pulses and to provide an output signal representing in amplitude the phase relation of the individual pulse pairs; and means coupled to receive the first pulse series and to clamp the output signal at a selected level in the absence of a selected number of pulses in the first pulse series.

11. In a system for generating an error signal for a servo system from either of a pair of reference pulse sequences, a first of which has twice the nominal frequency of the second, by comparison of either of the reference pulse sequences to a timing pulse sequence, the combination comprising: pulse generator means responsive to either of the two reference pulse sequences for generating a square wave, the pulse generator means providing pulses slightly longer in duration than the cyclic period of the first reference pulse sequence, ramp signal generator means coupled to generate substantially linearly ascending ramp waveforms starting substantially coincidentally with the leading edges of each pulse of the applied series; means responsive to the timing pulse sequences for generating sampling pulses at a nominal rate corresponding to the pulse repetition rate of the second reference pulse sequence; and phase comparison means coupled to receiving the sampling pulses and the ramp waveforms from the ramp signal generator means, and coupled to provide an output signal substantially corresponding to the amplitude of the ramp waveform at the time of application of the sampling pulses.

12. In a system for generating an error signal for control of a servo system from a pair of input waves, the combination comprising: first pulse generator means coupled to receive a first of the input waves, and providing a first pulse series, constant current generator means, including capacitor means, providing a substantially constant sawtooth waveform for each pulse of the first pulse series, second pulse generator means coupled to receive the second input wave and providing a second pulse series, the pulses being substantially shorter in duration than the pulses of the first pulse series, switching means coupled to receive the sawtooth waveforms and coupled to be controlled by the sampling pulses, means, including capacitor means coupled to the switching means for generating a DC output signal which varies in amplitude in relation to the amplitude of the sawtooth waveform at the time of occurrence of a sampling pulse, lead network means coupled to receive the DC output signal, and variable impedance means coupled to the lead network means, and characterized by variations in impedance in accordance with the amplitude of the signal applied thereto.

13. In a system for generating an error signal for a servo system for either of a pair of reference pulse sequences, a first of which has twice the nominal frequency of the second, the error signal being generated by comparing either of the reference pulse sequences to a timing pulse sequence, the combination comprising pulse peak clipper means including an input integrating circuit, the integrating circuit providing a varying threshold level for the peak clipper means, a monostable multivibrator coupled to receive the output signals from the pulse peak clipper means, the monostable multivibrator providing when actuated an output pulse of slightly greater duration than the cyclic period of pulses in the first reference pulse sequence; ramp signal generator means coupled to the output of the monostable multivibrator and providing a pulse waveform having a substantially sawtooth like waveform segment for each pulse therefrom; means responsive to the timing pulse sequence for generating sampling pulses of substantially shorter duration than the sawtooth segment of the ramp waveform; phase comparison means coupled to receive the sampling pulse and the pulse sawtooth waveforms, and to provide an output signal substantially corresponding to the amplitude of a pulse sawtooth waveform at the time of application of a sampling pulse; and means coupled to the output circuit of the phase comparison means and responsive to the threshold level of the pulse peak clipper means for selectively holding the amplitude of the output signal from the phase comparison means at a selected level in accordance with changes in the threshold level of the pulse peak clipper means.

14. The invention as set forth in claim 13 above wherein the pulse peak clipper means includes a normally non-conducting amplifier element which is driven to conduction by the peaks of applied pulses, and is also driven to conduction by a change in the input threshold due to the absence of a selected number of applied reference pulses; and wherein the clamping circuit further includes a normally non-conducting amplifier element which is controlled to conduct by the amplifier element of the pulse peak clipper means, and which operates to hold the amplitude of the output signal at a selected level when in the conducting state.

15. In a system for generating an error signal for control of a servo system from a pair of input waves, a first of which is in the form of a sequence of pulses and the second of which is in the form of a square wave, the combination comprising: a monostable multivibrator coupled to receive the first of the input waves and providing a square wave output signal in response thereto, a pulse generator receiving the square wave and generating relatively brief sampling pulses in response thereto, ramp signal generator means coupled to receive the generated square wave and including a constant current generator circuit; amplitude sampling means coupled to receive the ramp signal and controlled by the sampling pulses, for providing a variable amplitude output signal depend upon the phase relation between each square wave and corresponding sampling pulse; lead network means coupled to receive the output signal from the amplitude sampling means; variable impedance means including a bilateral semiconductor network coupled in series with the lead network means, the variable impedance means materially decreasing the amount of lead for small amplitude output signals; means for selectively short-circuiting the variable impedance means including output circuit means having an input terminal coupled to receive the output signal from the lead network means; clamping circuit means coupled to the input terminal of the output circuit; and means coupled to receive the pulses of the first input wave and controlling the operation of the clamping circuit means, such as to actuate the clamping means to maintain a selected output signal level in the absence of normally provided pulses in the first input wave.

16. In a system for generating an error signal for a servo system from a pair of input pulse sequences, a first of which provides a reference wave, the combination comprising: means responsive to the first pulse sequence for providing a first series of square wave pulses at a corresponding pulse repetition rate; ramp signal generator means coupled to generate substantially linearly ascending waveforms starting substantially coincidently with the leading edge of each pulse of the series; means responsive to the second pulse series for generatnig sampling pulses in a second series of square wave pulses having a corresponding pulse repetition rate; phase comparison means coupled to receive the sampling pulses and the ramp waveforms from the ramp signal generator means, and coupled to provide an output signal substantially corresponding to the amplitude of the ramp waveform at the time of application of the sampling pulses; lead-lag network means coupled to the phase comparison means; means coupled to the lead-lag network means for varying the impedance of the lead-lag network means in accordance with the amplitude of the signal applied thereto; and means coupled to receive the first pulse series and to clamp the signal from the lead-lag network means at a selected level in the absence of individual pulses in the first pulse series.

17. In a servo system for providing tracking control of a servo motor system in accordance with an applied error signal, a circuit for modifying the bandwidth of the system in accordance with the amplitude of the error signal, comprising: input terminal means coupled to receive the error signal; passive lead network means coupled to the input terminal means for introducing varying amounts of phase lead in the error signal dependent upon the amplitude thereof; and means, including non-linear impedance circuit elements, in series with the passive network means and introducing a significant impedance when the error signal is below a predetermined amplitude.

18. In a servo system for providing tracking control of a servo motor system in accordance with an applied error signal, a circuit for changing the bandwidth of the system to provide a relatively wide bandwidth with a relatively high amplitude error signal, and a relatively narrow bandwidth with a relatively low amplitude error signal, comprising: input terminal means coupled to receive the error signals; passive network means, coupled to the input terminal means for varying the error signal in accordance with changes therein, and variable impedance means, including a plurality of semiconductor diodes coupled in a bilateral network in series with the passive network means, the semiconductor diodes conducting to provide a low impedance when the error signal is in excess of a predetermined amplitude.

19. In a servo system for providing tracking control of a servo motor system in accordance with an applied error signal, a circuit for modifying the bandwidth of the system in accordance with different conditions of operation, comprising: input terminal means coupled to receive the error signal; passive lead-lag network means including capacitive and resistive elements coupled to the input terminal means, for introducing varying amounts of phase lead in the error signal dependent upon the amplitude thereof; variable impedance means coupled in series with the lead-lag network means, the variable impedance means comprising a plurality of bilateral semiconductor diodes having a logarithmic impedance characteristic, such that the impedance of the diodes is high when the forward bias thereon is below a selected level; and selectively operable short circuit means coupled in shunt across said bilateral semiconductor diodes.

20. In a system for providing reproduced signals from successively actuated scanning members, the combination of a record member from which signals are to be reproduced, a head drum having at least a pair of scanning heads for successively scanning the record member to reproduce signals, means coupled to the head drum for generating a signal identifying the phase and position of the head drum, servo means responsive to the head drum phase and position for controlling the head drum, reproducing circuit means, head switcher circuit means coupled to the scanning heads and to the reproducing circuit means and coupled to be operated by the signal identifying the phase and position of the head drum, and adjustable delay means responsive to the signal identifying the phase and position of the head drum and controlling the servo means, the adjustable delay means providing a range of delay in the signal at least in excess of the time interval required for successive scanning heads to pass a selected point.

21. In a system for providing reproduced wideband signals from two or more magnetic transducers which successively scan a magnetic record member along different tracks, the combination of a record member from which signals are to be reproduced, a rotating head drum having at least a pair of magnetic heads for successively scanning the tracks on the record member, tachometer means coupled to the head drum and providing a timing control signal representative of the phase and rotational speed of the head drum, reproducing circuit means, head switcher circuit means coupled to the magnetic heads and to the reproducing circuit means and including a control input coupled to receive timing control signals to govern the switching of the heads, servo means responsive to timing control signals for controlling the rotation of the head drum, and adjustable delay means, including a pair of series-connected adjustable monostable multivibrators coupled to receive the timing control signal and to provide a selectable delay thereof, the delayed signals being coupled to the servo means, the adjustable delay means providing a delay which is the equivalent of a full wavelength of the timing control signals.

22. In a control system for generating a wave having a selected phase relation to the instantaneous angular position of a rotating member, the combination of means coupled to the rotating member for generating pulses denoting equal subdivisions of the rotating member, and denoting a selected index point by a pair of pulses having a predetermined relatively short spacing interval, bistable means coupled to be changed in state by the generated pulses, and means responsive to the state of the bistable means for blocking the application of the generated pulses to the bistable means for a predetermined interval dependent upon the state thereof.

23. In a control system for generating a reference square wave for denoting successive half cycles of movement of a rotating scanning member, and for identifying a selected index point of the scanning member by a predetermined phase relationship of the reference wave, the combination comprising indicia means on the scanning member, the indicia means including at least a pair of indicia elements denoting the index point of the scanning member, and a single element denoting the alternate half cycle point of the scanning member, means disposed adjacent the scanning member for generating signals representative of the indicia, a bistable circuit coupled to be triggered by the generated signals, and an inhibit circuit responsive to the state of the bistable circuit and coupled to block the second of the closely spaced pair of pulses from the bistable circuit in response to the state of the bistable circuit.

24. In a control system for generating a reference wave which denotes the successive half cycles of movement of a scanning member by corresponding half cycles of a square wave, and identifies a selected index point of the scanning member by the initiation of a predetermined half cycle, the combination comprising magnetic indicia means on the scanning member, the indicia means including at least a pair of permanent magnetic elements positioned to denote the index point of the scanning member, one of the pair corresponding in position to the index point and the other being spaced relatively closely thereto, the indicia means also including a single permanent magnetic element positioned to denote the alternate half cycle point of the scanning member, magnetic reproducing means disposed adjacent the scanning member for generating electrical signals in response to the passage of the magnetic elements; a bistable circuit coupled to be triggered by the generated electrical signals; passive network means responsive to the change of state of the bistable circuit for providing inhibit pulses of predetermined duration, the inhibit pulses encompassing the pair of relatively closely spaced pulses, and an inhibit circuit responsive to the inhibit pulses and coupled between the magnetic reproducing means and the bistable circuit, whereby the second in the relatively closely spaced pulses is blocked when the bistable circuit is in the proper state, and transferred to trigger the bistable circuit when the bistable circuit is in an incorrect state, such that the index point is identified by a transition of predetermined direction in the square wave.

25. In a system which generates an error signal from the time relationship of individual pulses in two pulse trains, the combination comprising: means responsive to the two input pulse trains for generating a variable amplitude output signal representative of the time relationship of individual pulses therein; means responsive to a first of the pulse trains for generating a variable threshold level signal representative of the average amplitude thereof, and means including integrating means coupled to the means for generating a variable amplitude output signal, for maintaining the output signal at a selected level when the threshold level signal passes a selected level for a selected time.

26. In a system for deriving an error signal from the relationship of one cyclically varying input signal to that of another having the same nominal frequency, wherein a first of the input signals may be lost for indeterminate intervals, the combination comprising: means responsive to the two input signals for generating a variable amplitude output signal, the amplitude of the output signal varying in accordance with the time relationship of like cyclic parts of each of the two input signals; output circuit means coupled to receive the output signal; a bias circuit including a normally non-conductive amplifier element coupled to the output circuit means, and being ineffective to change the amplitude of the output signal when the amplifier element is non-conducting; and bias control means including a passive circuit coupled to receive the first of the input signals, and coupled to maintain the amplifier element non-conducting in the presence of an uninterrupted sequence of the first input signals.

27. In a system for deriving an error signal representative of the phase relationship between individual pulses of a first series having a selected nominal pulse repetition rate, and individual pulses of a second series having a like nominal repetition rate, wherein the pulses of the first series constitute time reference pulses which may be lost for indeterminate intervals, a system for minimizing loss of control in the event of the loss of the reference pulses comprising: phase comparator means responsive to the two input signals for generating a variable amplitude output signal, the amplitude of the output signal varying in accordance with the time relationship of like pulse pairs from the two input signals; compensation network means coupled to receive the output signal and to provide a compensated output signal; output circuit means coupled to receive the compensated output signal; a signal clamping circuit including a normally non-conductive amplifier element coupled to the output circuit means, the amplifier element including a control terminal, the clamping circuit also including bias means coupled to the amplifier element for maintaining the amplifier element normally non-conductive in the presence of signals at the control terminal which are in excess of a predetermined amplitude, and voltage divider means coupled to the amplifier element to maintain selected voltage levels during conduction thereof; and bias control means including a passive circuit coupled to receive the reference pulses and coupled to provide a control bias responsive thereto to the control terminal of the amplifier means, the time constant of the passive circuit maintaining the control bias below the preselected amplitude for an interval greater than one, but less than two, pulse periods between successive reference pulses provided at the nominal rate.

28. The method of improving the time base stability of signals reproduced after recording by a scanning member in a wideband system, including the steps of controlling the speed of the scanning member in accordance with a selected servo bandwidth during recording, providing a control signal representative of a speed variation during recording, and controlling the speed of the scanning member with reference to the control signal during signal reproduction, in accordance with a substantially narrower servo bandwidth.

29. The method of improving the time base stability of a signal recording and reproducing system which uses a relatively fast moving member and relatively slow moving member, both of which affect the time base of the signal, which includes the steps of driving the relatively slow moving member synchronously with an alternating current signal, driving the relatively fast moving member in comparison to a reference during recording, recording a control signal representative of a speed variation during recording, and driving the relatively fast moving member in comparison to the control signal during reproduction with a substantially slower speed response than during recording.

30. The invention as set forth in claim 29 above, including in addition the step of variably shifting the time relationship of the scanning member relative to the control signal during reproduction.

31. The method of improving the time base stability of signals reproduced after recording by a scanning member in a wideband system, including the steps of referencing the speed of the scanning member to a reference source during recording, maintaining speed control of the scanning member during recording in accordance with a relatively wide servo bandwidth, recording signals representative of actual speed variations of the scanning member during recording, reproducing the control signals during playback, referencing the speed of the scanning member to the reproduced control signals during playback, maintaining the speed of the scanning member referenced to the control signals during playback with a substantially narrower servo bandwidth when the error difference is below a selected amount, maintaining a selected fixed intermediate speed of the scanning member in the event that the control signal is lost during playback, and variably adjusting the position of the scanning member relative to the reference during playback.

References Cited

UNITED STATES PATENTS

| | | | |
|---|---|---|---|
| 3,271,526 | 9/1966 | Cochran | 178—6.6 |
| 3,318,998 | 5/1967 | Kihara | 179—100.25 |

JOHN W. CALDWELL, *Primary Examiner.*

H. W. BRITTON, *Assistant Examiner.*